(12) United States Patent
Rivett et al.

(10) Patent No.: US 7,258,930 B2
(45) Date of Patent: Aug. 21, 2007

(54) OXYGEN SCAVENGING FILM WITH CYCLIC OLEFIN COPOLYMER

(75) Inventors: Janet W Rivett, Simpsonville, SC (US); Drew V. Speer, Simpsonville, SC (US)

(73) Assignee: Cryovac, Inc., Duncan, SC (US)

( * ) Notice: Subject to any disclaimer, the term of this patent is extended or adjusted under 35 U.S.C. 154(b) by 153 days.

(21) Appl. No.: 11/074,188

(22) Filed: Mar. 7, 2005

(65) Prior Publication Data

US 2005/0244665 A1 Nov. 3, 2005

Related U.S. Application Data

(60) Provisional application No. 60/566,211, filed on Apr. 28, 2004.

(51) Int. Cl.
*B32B 27/32* (2006.01)

(52) U.S. Cl. .................... 428/516; 428/520

(58) Field of Classification Search ............... 428/515, 428/516, 520, 523; 524/398
See application file for complete search history.

(56) References Cited

U.S. PATENT DOCUMENTS

| | | | |
|---|---|---|---|
| 4,501,634 A | 2/1985 | Yoshimura et al. | |
| 4,642,269 A | 2/1987 | Kohyama et al. | |
| 4,643,945 A | 2/1987 | Kiang | |
| 4,725,505 A | 2/1988 | Hwo et al. | |
| 4,727,112 A | 2/1988 | Kohyama et al. | |
| 4,727,113 A | 2/1988 | Kohyama et al. | |
| 4,820,590 A | 4/1989 | Hodgson, Jr. et al. | |
| 4,863,784 A | 9/1989 | Lustig et al. | |
| 4,921,749 A | 5/1990 | Bossaert et al. | |
| 4,963,419 A | 10/1990 | Lustig et al. | |
| 5,023,143 A | 6/1991 | Nelson | |
| 5,059,481 A | 10/1991 | Lustig et al. | |
| 5,066,543 A | 11/1991 | Hwo | |
| 5,084,360 A | 1/1992 | Young | |
| 5,252,385 A | 10/1993 | Kagawa et al. | |
| 5,256,428 A | 10/1993 | Lustig et al. | |
| 5,260,382 A | 11/1993 | Kohyama et al. | |
| 5,273,797 A | 12/1993 | Hazelton et al. | |
| 5,300,353 A | 4/1994 | Yoshimura et al. | |
| 5,346,644 A | 9/1994 | Speer et al. | |
| 5,350,622 A * | 9/1994 | Speer et al. | 428/215 |
| 5,358,792 A | 10/1994 | Mehta et al. | |
| 5,399,289 A * | 3/1995 | Speer et al. | 252/188.28 |
| 5,419,960 A | 5/1995 | Touhsaent | |
| 5,439,717 A | 8/1995 | Lustig et al. | |
| 5,462,807 A | 10/1995 | Halle et al. | |
| 5,492,741 A | 2/1996 | Akao et al. | |
| 5,529,833 A | 6/1996 | Speer et al. | |
| 5,561,208 A | 10/1996 | Takahashi et al. | |
| 5,583,192 A | 12/1996 | Bennett et al. | |
| 5,629,398 A | 5/1997 | Okamoto et al. | |
| 5,648,020 A | 7/1997 | Speer et al. | |
| 5,648,443 A | 7/1997 | Okamoto et al. | |
| 5,658,625 A | 8/1997 | Bradfute et al. | |
| 5,700,554 A | 12/1997 | Speer et al. | |
| 5,723,545 A | 3/1998 | Harrington et al. | |
| 5,780,168 A | 7/1998 | Satoh et al. | |
| 5,837,787 A | 11/1998 | Harrington et al. | |
| 5,846,620 A | 12/1998 | Compton | |
| 5,898,050 A | 4/1999 | Shih et al. | |
| 5,942,297 A * | 8/1999 | Speer et al. | 428/35.4 |
| 5,993,922 A | 11/1999 | Babrowicz et al. | |
| 5,998,039 A | 12/1999 | Tanizaki et al. | |
| 6,017,616 A | 1/2000 | Kochem et al. | |
| 6,030,255 A | 2/2000 | Konishi et al. | |
| 6,060,136 A * | 5/2000 | Patrick et al. | 428/35.2 |
| 6,165,573 A | 12/2000 | Hirose et al. | |
| 6,191,218 B1 | 2/2001 | Lustiger | |
| 6,214,254 B1 | 4/2001 | Gauthier et al. | |
| 6,255,248 B1 * | 7/2001 | Bansleben et al. | 502/159 |
| 6,262,174 B1 | 7/2001 | Cooper et al. | |
| 6,310,160 B1 | 10/2001 | Kodemura | |

(Continued)

FOREIGN PATENT DOCUMENTS

DE 102 38 515 8/2002

(Continued)

OTHER PUBLICATIONS

Special Chem—Omnexus, "Ticona Making Performance Dreams a Reality", www.Omnexus.com, Apr. 28, 2004, 2 pages.

(Continued)

*Primary Examiner*—D. Lawrence Tarazano
(74) *Attorney, Agent, or Firm*—Mark B. Quatt

(57) ABSTRACT

An oxygen scavenger film includes a layer including an oxygen scavenger, and a layer including a cyclic olefin copolymer. An oxygen scavenger film includes a layer including a blend of an oxygen scavenger, and a cyclic olefin copolymer. A method of triggering an oxygen scavenger film includes providing an oxygen scavenger film including a layer including an oxygen scavenger, and a layer including a cyclic olefin copolymer; and subjecting the oxygen scavenger film to a dosage of actinic radiation effective to trigger the oxygen scavenger. A method of triggering an oxygen scavenger film includes providing an oxygen scavenger film including a layer including a blend of an oxygen scavenger and a cyclic olefin copolymer; and subjecting the oxygen scavenger film to a dosage of actinic radiation effective to trigger the oxygen scavenger.

30 Claims, 2 Drawing Sheets

U.S. PATENT DOCUMENTS

| | | |
|---|---|---|
| 6,333,087 B1 | 12/2001 | Jerdee et al. |
| 6,447,899 B1 | 9/2002 | Dutton et al. |
| 6,479,138 B1 | 11/2002 | Childress |
| 6,670,423 B2 | 12/2003 | Hausmann |
| 6,767,966 B2 | 7/2004 | Berger et al. |
| 7,056,593 B2 * | 6/2006 | Kennedy et al. ............ 428/516 |
| 2001/0008687 A1 | 7/2001 | Kollaja et al. |
| 2002/0102424 A1 * | 8/2002 | Yang et al. ................. 428/520 |
| 2003/0170479 A1 | 9/2003 | Peiffer et al. |
| 2003/0180489 A1 | 9/2003 | Reighard et al. |
| 2003/0235708 A1 | 12/2003 | Yang et al. |
| 2004/0048086 A1 * | 3/2004 | Kennedy et al. ............ 428/517 |
| 2004/0067382 A1 | 4/2004 | Niepelt |
| 2004/0127614 A1 | 7/2004 | Jiang et al. |
| 2004/0142195 A1 | 7/2004 | Roberts et al. |
| 2004/0151934 A1 * | 8/2004 | Schwark et al. ............ 428/518 |
| 2005/0112337 A1 * | 5/2005 | Jester ......................... 428/200 |
| 2006/0083940 A1 * | 4/2006 | Bekele .................... 428/474.4 |
| 2006/0177653 A1 * | 8/2006 | Rivett et al. ................ 428/347 |
| 2006/0272767 A1 * | 12/2006 | Kreitman et al. ...... 156/244.11 |

FOREIGN PATENT DOCUMENTS

| | | |
|---|---|---|
| DE | 102 38 516 | 8/2002 |
| EP | 0 120 562 A2 | 10/1984 |
| EP | 0 229 715 B1 | 5/1992 |
| EP | 0 773 102 A1 | 5/1997 |
| EP | 1 174 262 | 1/2002 |
| EP | 1 219 412 | 7/2002 |
| EP | 1 398 149 A1 | 9/2002 |
| EP | 1 300 238 A2 | 4/2003 |
| EP | 1 426 181 | 4/2003 |
| JP | 5-262899 | 10/1993 |
| JP | 8059917 A | 3/1996 |
| JP | 8-165357 | 6/1996 |
| JP | 8-267679 | 10/1996 |
| WO | 94/17113 | 8/1994 |
| WO | WO96/08371 | 3/1996 |
| WO | WO97/32925 | 9/1997 |
| WO | WO98/29249 | 7/1998 |
| WO | 00/00538 | 6/1999 |
| WO | 00/11972 | 8/1999 |
| WO | 99/48963 | 9/1999 |
| WO | 2004/018204 A1 | 3/2004 |
| WO | WO 2005/066300 A1 * | 7/2005 |

OTHER PUBLICATIONS

Celanese AG, "Background stories—Packaging material made of Topas", www.ticona-media.com, Feb. 2004, 2 pages.

Jan H. Schut, "Close-Up: Materials New Cyclic Olefins", Plastics Technology Online, Mar. 2000, 3 pages.

Celanese, "Cyclic Olefin Copolymers (COC)", www.ticona.com, Mar. 17, 2004, 3 pages.

Celanese AG, "Pactiv Extends Zipper Closures Containing Topas® COC to Packaging for Meat and Animal Crackers", www.celanese.com, Mar. 2, 2004, 3 pages.

A. Weinberg, "A Decade of the Good Stuff: Packaging Applications Enabled by Metallocene Resins", American Chemical Society meeting, Apr. 7-11, 2002, Orlando, Florida, 7 pages.

J. Schut, "Materials Close Up: New Cyclic Olefins Are Clearly Worth A Look", Plastics Technology, Mar. 2000, 2 pages.

J. Schut, "Close-Up: Materials New Cyclic Olefins", Plastics Technology, Mar. 2000, 3 pages.

Pactiv/Ticona/Celanese Press Release, "Ticona's Topas® COC Selected for Hefty® Slide-Rite® Closure Systems to Gain Stiffness, Strength and Straightness in Packaging Bags", www.blowmoldingmatters.com, Oct. 23, 2001, 4 pages.

D. McNally, "Cyclic Olefin Copolymer", Modern Plastics 2001 World Encyclopedia, 3 pages.

Ticona Product Brochure, "Product-Portfolio, High-Performance Polymeres for Innovative Applications," Europe, Apr. 2000, pp. 1-28.

R.R. Lamonte et al., "Uses And Processing Of Cyclic Olefin Copolymers (COC)", Plastic Engineering, vol. 56, No. 6, pp. 1-9, undated.

Ticona Product Brochure, Topas® Thermoplastic Olefin Polymer of Amorphous Structure (COC), Aug. 2000, pp. 1-20.

Celanese Product Brochure, "Enginnering Polymers for Innovative Applications," Jan. 2000, pp. 1-16.

T. Weller, "Topas prepares for take off", Germany New Plastics (based on paper presented at the European Plastics News, New Plastics 1998 Conference), Jun. 1998, 2 pages.

Ticona, "Application Story, Topas® Cyclic Olefin Copolymer . . . Multilayer Film", Jun. 2001, 2 pages.

Ticona, "Flexible Packaging, Topas® Cyclic Olefin Copolymer", Jan. 2000, 4 pages.

Ticona, "Application Story, Topas® Cyclic Olefin Copolymer", . . . Novel Lidding Stock, Sep. 2001, 2 pages.

Patent Abstracts of Japan, vol. 2000. No. 03, Mar. 30, 2000 & JP 11 333999 A (Unitika Ltd.). Dec. 7, 1999.

Patent Abstracts of Japan, vol. 018. No. 653 (M-1720). Dec. 12, 1994 & JP 06 255053 A (Toray Ind. Inc.) Sep. 13, 1994.

* cited by examiner

Film Structure A.

| COC | OS |
|---|---|
| 0.50 | 0.50 |

FIG. 1

Film Structure B.

| EAO | COC | OS |
|---|---|---|
| 0.25 | 0.50 | 0.50 |

FIG. 2

Film Structure C.

| EAO | COC | OS | OB |
|---|---|---|---|
| 0.25 | 0.50 | 0.50 | 0.25 |

FIG. 3

Film Structure D.

| EAO | COC | OS | OB | PE |
|---|---|---|---|---|
| 0.25 | 0.50 | 0.50 | 0.25 | 0.25 |

FIG. 4

Film Structure E.

| EAO | COC | OS | OB | ADH | PE | PET |
|---|---|---|---|---|---|---|
| 0.25 | 0.50 | 0.50 | 0.25 | 0.20 | 0.25 | 0.50 |

FIG. 5

Film Structure F.

| EAO | COC | OS | ADH | NYLON | OB1 | NYLON | ADH | PE | PET |
|---|---|---|---|---|---|---|---|---|---|
| 0.25 | 0.50 | 0.50 | 0.20 | 0.20 | 0.25 | 0.20 | 0.20 | 0.25 | 0.50 |

FIG. 6

OXYGEN SCAVENGING FILM WITH CYCLIC OLEFIN COPOLYMER

This application claims the benefit of U.S. Provisional Application Ser. No. 60/566,211 filed Apr. 28, 2004, the contents of which are hereby incorporated by reference.

FIELD OF THE INVENTION

The invention relates to oxygen scavenging film with cyclic olefin copolymer.

BACKGROUND OF THE INVENTION

It is known that many oxygen sensitive products, including food products such as meat and cheese, smoked and processed luncheon meats, as well as non-food products such as electronic components, pharmaceuticals, and medical products, deteriorate in the presence of oxygen. Both the color and the flavor of foods can be adversely affected. The oxidation of lipids within the food product can result in the development of rancidity. These products benefit from the use of oxygen scavengers in their packaging.

One particular oxygen scavenger that has proved useful commercially is poly(ethylene/methyl acrylate/cyclohexene methyl acrylate) (abbreviated as EMCM). Although EMCM containing oxygen scavenging films have excellent cold seal strength, an EMCM layer tends to delaminate from adjacent layers at temperatures of 100 to 150 °C. These temperatures are typical of those encountered during, or immediately after, heat sealing of the film to itself or another material. Delamination can occur in packaging applications where vertically formed and filled packages are loaded before the heat seals are able to cool substantially. Due to poor interlayer adhesion at these elevated temperatures, the films delaminate at the EMCM interface when seals are pulled before they are totally cooled.

In packaging applications such as vertical form fill seal pouch packaging, where transverse heat seals are used, poor interlaminar bond strength will be manifested as a low hot tack value (below 4 newtons/inch at 130° C.). The failure mode is typically one of delamination at the interface of the sealant layer and the EMCM layer, and/or the EMCM layer and the next adjacent (internal) layer.

A target hot tack value, which will represent a value typically minimally acceptable for many packaging applications, is at least 4 newtons/inch at 130° C. Desirable values include from 4 to 10 newtons/inch, such as 4.5 to 9.5 newtons/inch, such as 5 to 9, and 5.5 to 8.5, and 6 to 8 newtons/inch at 130° C. Hot tack is measured in accordance with ASTM F 1921-98.

In addition, EMCM containing oxygen scavenging films can sometimes exhibit undesirable organoleptic characteristics depending on the product being packaged in the film, conditions of packaging or storage, etc.

It has now been found that cyclic olefin copolymers (COC) in a film structure having an oxygen scavenger such as EMCM offers a means for providing adequate interlaminar bond strength between the oxygen scavenger and adjacent layers, and good hot tack seals.

It is believed that cyclic olefin copolymers (COC) in a film structure having an oxygen scavenger such as EMCM also offers a means for providing a functional barrier that can reduce adverse organoleptic qualities in the film.

SUMMARY OF THE INVENTION

In a first aspect of the present invention, an oxygen scavenger film comprises a layer comprising an oxygen scavenger, and a layer comprising a cyclic olefin copolymer.

In a second aspect of the present invention, an oxygen scavenger film comprises a layer comprising a blend of an oxygen scavenger and a cyclic olefin copolymer.

In a third aspect of the present invention, a method of triggering an oxygen scavenger film comprises providing an oxygen scavenger film comprising a layer comprising an oxygen scavenger, and a layer comprising a cyclic olefin copolymer; and subjecting the oxygen scavenger film to a dosage of actinic radiation effective to trigger the oxygen scavenger.

In a fourth aspect of the present invention, a method of triggering an oxygen scavenger film comprises providing an oxygen scavenger film comprising a layer comprising a blend of an oxygen scavenger and a cyclic olefin copolymer, and subjecting the oxygen scavenger film to a dosage of actinic radiation effective to trigger the oxygen scavenger.

BRIEF DESCRIPTION OF THE DRAWINGS

A detailed description of embodiments of the invention follows, with reference to the attached drawings, wherein:

FIG. 1 is a schematic view of a film structure in accordance with one embodiment of the invention;

FIG. 2 is a schematic view of a film structure in accordance with another embodiment of the invention;

FIG. 3 is a schematic view of a film structure in accordance with another embodiment of the invention;

FIG. 4 is a schematic view of a film structure in accordance with another embodiment of the invention;

FIG. 5 is a schematic view of a film structure in accordance with another embodiment of the invention; and FIG. 6 is a schematic view of a film structure in accordance with another embodiment of the invention.

DEFINITIONS

"Cyclic olefin copolymer" and the like herein means a composition such as ethylene/norbornene copolymer, such as that supplied by Ticona under the trademark TOPAS™.

"Oxygen scavenger", "oxygen scavenging", and the like herein means or refers to a composition, compound, film, film layer, coating, plastisol, gasket, or the like which can consume, deplete or react with oxygen from a given environment.

"Ethylene/alpha-olefin copolymer" (EAO) herein refers to copolymers of ethylene with one or more comonomers selected from $C_3$ to $C_{10}$ alpha-olefins such as propene, butene-1, hexene-1, octene-1, etc. in which the molecules of the copolymers comprise long polymer chains with relatively few side chain branches arising from the alpha-olefin which was reacted with ethylene. This molecular structure is to be contrasted with conventional high pressure low or medium density polyethylenes which are highly branched with respect to EAOs and which high pressure polyethylenes contain both long chain and short chain branches. EAO includes such heterogeneous materials as linear medium density polyethylene (LMDPE), linear low density polyethylene (LLDPE), and very low and ultra low density polyethylene (VLDPE and ULDPE), such as DOWLEX™ or ATTANE™ resins supplied by Dow, and ESCORENE™ or EXCEED™ resins supplied by Exxon; as well as linear homogeneous ethylene/alpha olefin copolymers (HEAO)

such as TAFMER™ resins supplied by Mitsui Petrochemical Corporation, EXACT™ resins supplied by Exxon, or long chain branched (HEAO) AFFINITY™ resins supplied by the Dow Chemical Company, or ENGAGE™ resins supplied by DuPont Dow Elastomers.

"Ethylene homopolymer or copolymer" herein refers to ethylene homopolymer such as low density polyethylene; ethylene/alpha olefin copolymer such as those defined herein; ethylene/vinyl acetate copolymer, ethylene/alkyl acrylate copolymer, ethylene/(meth)acrylic acid copolymer; or ionomer resin.

"Film" herein means a film, laminate, sheet, web, coating, or the like, which can be used to package an oxygen sensitive product. The film can be used as a component in a rigid, semi-rigid, or flexible product, and can be adhered to a non-polymeric or non-thermoplastic substrate such as paper or metal. The film can also be used as a coupon or insert within a package.

"Functional barrier" herein means a polymeric material which acts as a selective barrier to by-products from the oxygen scavenging reaction, but is not itself a significant barrier to oxygen.

"Polymer" and the like herein means a homopolymer, but also copolymers thereof, including bispolymers, terpolymers, etc.

"Trigger" and the like herein means that process defined in U.S. Pat. No. 5,211,875, whereby oxygen scavenging is initiated (i.e. activated) by subjecting an article such as a film to actinic radiation, having a wavelength of less than about 750 nm at an intensity of at least about 1.6 mW/cm$^2$ or ionizing radiation such as an electron beam at a dose of at least 0.2 megarads (MR), or gamma radiation, wherein after initiation the oxygen scavenging rate of the article is at least about 0.05 cc oxygen per day per gram of oxidizable organic compound for at least two days after oxygen scavenging is initiated. A method offering a short "induction period" (the time that elapses, after exposing the oxygen scavenging component to a source of actinic radiation, before the oxygen scavenging activity begins) is useful in situations where the oxygen scavenging component is desirably activated at or immediately prior to use. Triggering can thus occur during filling and sealing of a container, which is made wholly or partly from the article, and containing an oxygen sensitive material.

Thus, "trigger" refers to subjecting an article to actinic radiation as described above; "triggered" refers to an article that has been subjected to such actinic radiation; "initiation" refers to the point in time at which oxygen scavenging actually begins or is activated; and "induction time" refers to the length of time, if any, between triggering and initiation. The onset of oxygen scavenging can be measured by any convenient means such as a reduction in headspace oxygen concentration, or an increase in barrier property as in the case of an active oxygen barrier system. One useful technology is the use of certain porphyrins as an oxygen indicator in a solid article such as a film, as disclosed in U.S. Pat. No., incorporated herein by reference in its entirety.

All compositional percentages used herein are presented on a "by weight" basis, unless designated otherwise.

DETAILED DESCRIPTION OF THE INVENTION

An oxygen scavenger film of the invention can include multiple layers, dependent upon the properties required of the film. For example, layers to achieve appropriate slip, modulus, oxygen or water vapor barrier, meat adhesion, heat seal, or other chemical or physical properties can optionally be included. The film may be manufactured by a variety of processes including, extrusion, coextrusion, lamination, coating, and the like.

An outer layer of the film, such as a layer that will function as a sealant layer of the film, can comprise one or more polymers. Polymers that may be used for the surface layer include any resin typically used to formulate packaging films with heat seal properties such as various polyolefin copolymers including ethylene polymer or copolymer, ethylene/alpha olefin copolymer, ethylene/vinyl acetate copolymer, ionomer resin, ethylene/acrylic or methacrylic acid copolymer, ethylene/acrylate or methacrylate copolymer, low density polythylene, or blends of any of these materials.

Additional materials that can be incorporated into an outer layer of the film include antiblock agents, slip agents, etc.

Oxygen Barrier Film

High oxygen barrier films can be made from materials having an oxygen permeability, of the barrier material, less than 500 cm$^3$O$_2$/m$^2$·day·atmosphere (tested at 1 mil thick and at 25° C. according to ASTM D3985), such as less than 100, more preferably less than 50 and most preferably less than 25 cm$^3$O$_2$/m$^2$·day·atmosphere such as less than 10, less than 5, and less than 1 cm$^3$O$_2$/m$^2$·day·atmosphere. Examples of polymeric materials with low oxygen transmission rates are ethylene/vinyl alcohol copolymer (EVOH), polyvinylidene dichloride (PVDC), vinylidene chloride/methyl acrylate copolymer, polyamide, and polyester.

Alternatively, metal foil or SiOx compounds can be used to provide low oxygen transmission to the container. Metalized foils can include a sputter coating or other application of a metal layer to a polymeric substrate such as high density polyethylene (HDPE), ethylene/vinyl alcohol copolymer (EVOH), polypropylene (PP), polyethylene terephthalate (PET), polyethylene naphthalate (PEN), and polyamide (PA).

Alternatively, oxide coated webs (e.g. aluminum oxide or silicon oxide) can be used to provide low oxygen transmission to the container. Oxide coated foils can include a coating or other application of the oxide, such as alumina or silica, to a polymeric substrate such as high density polyethylene (HDPE), ethylene/vinyl alcohol copolymer (EVOH), polypropylene (PP), polyethylene terephthalate (PET), polyethylene naphthalate (PEN), and polyamide (PA).

Multilayer films of the invention can be made using conventional extrusion, coextrusion, and/or lamination processes. Likewise, conventional manufacturing processes can be used to make a pouch, a bag, or other container from the film.

Hermetic sealing of a pouch, bag, or other container made from the film of the invention will typically be preferable.

The exact requirements of a container made from the film will depend on a variety of factors, including the chemical nature of the oxygen scavenger, amount of the oxygen scavenger, concentration of the oxygen scavenger in a host material or diluent, physical configuration of the oxygen scavenger, presence of hermetic sealing, vacuumization and/or modified atmosphere inside the container, initial oxygen concentration inside the container, intended end use of the oxygen scavenger, intended storage time of the container before use, level of initial dose of actinic radiation, etc.

Polymeric adhesives that can be used in embodiments of the present invention include e.g. ethylene/vinyl acetate copolymer; anhydride grafted ethylene/vinyl acetate copolymer; anhydride grafted ethylene/alpha olefin copolymer; anhydride grafted polypropylene; anhydride grafted low density polyethylene; ethylene/methyl acrylate copolymer; and anhydride grafted ethylene/methyl acrylate copolymer.

The Oxygen Scavenger

Oxygen scavengers suitable for commercial use in articles of the present invention, such as films, are disclosed in U.S. Pat. No. 5,350,622, and a method of initiating oxygen scavenging generally is disclosed in U.S. Pat. No. 5,211,875. Suitable equipment for initiating oxygen scavenging is disclosed in U.S. Pat. No. 6,287,481 (Luthra et al.). These patents are incorporated herein by reference in their entirety. According to U.S. Pat. No. 5,350,622, oxygen scavengers are made of an ethylenically unsaturated hydrocarbon and transition metal catalyst. The ethylenically unsaturated hydrocarbon may be either substituted or unsubstituted. As defined herein, an unsubstituted ethylenically unsaturated hydrocarbon is any compound that possesses at least one aliphatic carbon-carbon double bond and comprises 100% by weight carbon and hydrogen. A substituted ethylenically unsaturated hydrocarbon is defined herein as an ethylenically unsaturated hydrocarbon which possesses at least one aliphatic carbon-carbon double bond and comprises about 50%-99% by weight carbon and hydrogen. Suitable substituted or unsubstituted ethylenically unsaturated hydrocarbons are those having two or more ethylenically unsaturated groups per molecule, e.g. a polymeric compound having three or more ethylenically unsaturated groups and a molecular weight equal to or greater than 1,000 weight average molecular weight.

Examples of unsubstituted ethylenically unsaturated hydrocarbons include, but are not limited to, diene polymers such as polyisoprene, (e.g., trans-polyisoprene) and copolymers thereof, cis and trans 1,4-polybutadiene, 1,2-polybutadienes, (which are defined as those polybutadienes possessing greater than or equal to 50% 1,2 microstructure), and copolymers thereof, such as styrene/butadiene copolymer and styrene/isoprene copolymer. Such hydrocarbons also include polymeric compounds such as polypentenamer, polyoctenamer, and other polymers prepared by cyclic olefin metathesis; diene oligomers such as squalene; and polymers or copolymers with unsaturation derived from dicyclopentadiene, norbomadiene, 5-ethylidene-2-norbomene, 5-vinyl-2-norbomene, 4-vinylcyclohexene, 1,7-octadiene, or other monomers containing more than one carbon-carbon double bond (conjugated or non-conjugated).

Examples of substituted ethylenically unsaturated hydrocarbons include, but are not limited to, those with oxygen-containing moieties, such as esters, carboxylic acids, aldehydes, ethers, ketones, alcohols, peroxides, and/or hydroperoxides. Specific examples of such hydrocarbons include, but are not limited to, condensation polymers such as polyesters derived from monomers containing carbon-carbon double bonds, and unsaturated fatty acids such as oleic, ricinoleic, dehydrated ricinoleic, and linoleic acids and derivatives thereof, e.g. esters. Specific examples also include esters or polyesters of functionalized unsaturated hydrocarbons such as hydroxy terminated polybutadiene. Such hydrocarbons also include polymers or copolymers derived from (meth)allyl (meth)acrylates. Suitable oxygen scavenging polymers can be made by trans-esterification. Such polymers are disclosed in U.S. Pat. No. 5,859,145 (Ching et al.) (Chevron Research and Technology Company), incorporated herein by reference as if set forth in full. The composition used may also comprise a mixture of two or more of the substituted or unsubstituted ethylenically unsaturated hydrocarbons described above. While a weight average molecular weight of 1,000 or more is beneficial, an ethylenically unsaturated hydrocarbon having a lower molecular weight is also usable, especially if it is blended with a film-forming polymer or blend of polymers.

An additional example of oxygen scavengers which can be used in connection with this invention are disclosed in PCT patent publication WO 99/48963 (Chevron Chemical et al.), incorporated herein by reference in its entirety. These oxygen scavengers include a polymer or oligomer having at least one cyclohexene group or functionality. These oxygen scavengers include a polymer having a polymeric backbone, cyclic olefinic pendent group, and linking group linking the olefinic pendent group to the polymeric backbone.

An oxygen scavenging composition suitable for use with the invention comprises:

(a) a polymer or lower molecular weight material containing substituted cyclohexene functionality according to the following diagram:

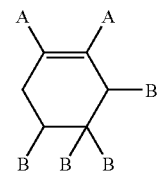

where A may be hydrogen or methyl and either one or two of the B groups is a heteroatom-containing linkage which attaches the cyclohexene ring to the said material, and wherein the remaining B groups are hydrogen or methyl;

(b) a transition metal catalyst; and (c) a photoinitiator.

The compositions may be polymeric in nature or they may be lower molecular weight materials. In either case, they may be blended with further polymers or other additives. In the case of low molecular weight materials, they will most likely be compounded with a carrier resin before use.

Also suitable for use in the present invention is the oxygen scavenger of U.S. Pat. No. 6,255,248 (Bansleben et al.), incorporated herein by reference in its entirety, which discloses a copolymer of ethylene and a strained, cyclic alkylene, preferably cyclopentene; and a transition metal catalyst.

Another oxygen scavenger which can be used in connection with this invention is the oxygen scavenger of U.S. Pat. No. 6,214,254 (Gauthier et al.), incorporated herein by reference in its entirety, which discloses ethylene/vinyl aralkyl copolymer and a transition metal catalyst.

Transition Metal Catalysts

As indicated above, the ethylenically unsaturated hydrocarbon is combined with a transition metal catalyst. Suitable metal catalysts are those that can readily interconvert between at least two oxidation states.

The catalyst can be in the form of a transition metal salt, with the metal selected from the first, second or third transition series of the Periodic Table. Suitable metals include, but are not limited to, manganese II or III, iron II or III, cobalt II or III, nickel II or III, copper I or II, rhodium II, III or IV, and ruthenium II or III. The oxidation state of the metal when introduced is not necessarily that of the active form. Suitable counterions for the metal include, but are not limited to, chloride, acetate, stearate, palmitate, caprylate, linoleate, tallate, 2-ethylhexanoate, neodecanoate, oleate or naphthenate. Useful salts include cobalt (II) 2-ethylhexanoate, cobalt stearate, and cobalt (II) neodecanoate.

The metal salt may also be an ionomer, in which case a polymeric counterion is employed. Such ionomers are well known in the art.

Any of the above-mentioned oxygen scavengers and transition metal catalyst can be further combined with one or more polymeric diluents, such as thermoplastic polymers, which are typically used to form film layers in plastic packaging articles. In the manufacture of certain packaging articles well known thermosets can also be used as the polymeric diluent.

Further additives can also be included in the composition to impart properties desired for the particular article being manufactured. Such additives include, but are not necessarily limited to, fillers, pigments, dyestuffs, antioxidants, stabilizers, processing aids, plasticizers, fire retardants, etc.

The mixing of the components listed above can be accomplished by melt blending at a temperature in the range of 50° C. to 300° C. However, alternatives such as the use of a solvent followed by evaporation may also be employed.

Photoinitiators

Some of the materials useful in connection with the invention include:

1,3,5-tris(4-benzoylphenyl)benzene (BBP$^3$)
isopropylthioxanthone (ITX)
bis(2,4,6-trimethylbenzoyl)phenylphosphineoxide (IRGACURE®819)
2,4,6-trimethylbenzoyldiphenylphosphine oxide
ethyl-2,4,6-trimethylbenzoylphenyl phosphinate
bis(2,6-dimethoxybenzoyl)-2,4,4-trimethylpentyl phosphine oxide
4,4'-benzoylmethyl diphenyl sulfide (BMS)

The amount of photoinitiator can depend on the amount and type of unsaturation present in the polymer, the wavelength and intensity of radiation used; the nature and amount of antioxidants used; and the type of photoinitiator used.

EXAMPLES

Several film structures in accordance with the invention are identified below and in the drawings. "COC" is a cyclic olefin copolymer; "OS" is an oxygen scavenger; "EAO" is ethylene/alpha olefin copolymer; "OB" is oxygen barrier; "PE" is ethylene homopolymer or copolymer, such as low density polyethylene or ethylene/alpha olefin copolymer; "ADH" is adhesive, such as polymeric adhesive; and "NYLON" is a polyamide or copolyamide.

FIG. 1 is a schematic view of Film Structure A in accordance with one embodiment of the invention. The total gauge of Film Structure A is 1.0 mil, with the thickness of each layer, in mils, as indicated in FIG. 1.

FIG. 2 is a schematic view of Film Structure B in accordance with another embodiment of the invention. The total gauge of Film Structure B is 1.25 mils, with the thickness of each layer, in mils, as indicated in FIG. 2.

FIG. 3 is a schematic view of Film Structure C in accordance with another embodiment of the invention. The total gauge of Film Structure C is 1.5 mils, with the thickness of each layer, in mils, as indicated in FIG. 3.

FIG. 4 is a schematic view of Film Structure D in accordance with another embodiment of the invention. The total gauge of Film Structure D is 1.75 mils, with the thickness of each layer, in mils, as indicated in FIG. 4.

FIG. 5 is a schematic view of Film Structure E in accordance with another embodiment of the invention. The total gauge of Film Structure E is 2.45 mils, with the thickness of each layer, in mils, as indicated in FIG. 5. A film comprising PET (poly(ethylene terephthalate) is shown adhered by lamination, such as adhesive lamination, or any other suitable means to the PE layer of the film.

FIG. 6 is a schematic view of Film Structure F in accordance with another embodiment of the invention. The total gauge of Film Structure F is 3.05 mils, with the thickness of each layer, in mils, as indicated above in FIG. 6.

The COC can be blended with the oxygen scavenger layer instead of, or in addition to, being present in a layer separate from the oxygen scavenger layer.

The COC can be blended with the sealant (EAO) layer instead of, or in addition to, being present in a layer separate from the sealant layer.

The COC layer can be used "neat", i.e. without the addition of significant amounts of other materials in the same layer, or can be blended with a polyolefin such as ethylene homopolmer or copolymer. When EMCM or other oxygen scavengers are used to scavenge oxygen from the headspace of a package or container, it is sometimes important that the COC layer have a sufficient high oxygen permeability (oxygen transmission rate) to allow the oxygen from the headspace to move through the film structure to the oxygen scavenger layer at a sufficient rate to effect the oxygen scavenging functionality of the film. With increasing thickness of the COC layer, the presence of increasing amounts of blended polyolefin will aid in controlling the overall oxygen transmission rate of the COC layer.

The sealant layer can comprise, instead of EAO, a propylene polymer or copolymer, such as ethyene/propylene copolymer, or an ethylene homopolymer or copolymer, such as low density polyethylene or ethylene/vinyl acetate copolymer, or ethylene/acrylic or methacrylic acid copolymer, or ionomer.

Additional materials, including polymeric materials or other organic or inorganic additives, can be added to any or all of the layers of the above structures as needed, and additional film layers can be included either within the film structure, or adhered to an outer layer thereof.

Film as described herein can be produced by any suitable method, including coextrusion, extrusion coating, lamination, extrusion lamination, etc.

The sealant side of the PE layer of structures E and F, i.e. that side of the layer that will adhere to the PET film, can alternatively be adhered to another polymer, to paperboard, or to foil such as metal foil.

Films useful in connection with the invention can have any suitable number of layers, such as a total of from 2 to 20 layers.

In general, the film can have any total thickness desired, and each layer can have any thickness desired, so long as the film provides the desired properties for the particular packaging operation in which the film is used. Typical total thicknesses are from 0.5 mils to 15 mils, such as 1 mil to 12 mils, such as 2 mils to 10 mils, 3 mils to 8 mils, and 4 mils to 6 mils.

In the above film structures, the interface between the oxygen barrier layer and the oxygen scavenger layer will typically include an adhesive or tie layer, such as one of the polyermic adhesives described herein.

The invention is not limited to the illustrations described herein, which are deemed to be merely illustrative, and susceptible of modification of form, size, arrangement of parts and details of operation.

The following film structures in accordance with the invention were made by a conventional coextrusion process.

Materials used were as follows.

Resin Identification

| Material Code | Tradename Or Designation | Source(s) |
|---|---|---|
| | PE4517 | Chevron |
| AB | 10853 | Ampacet |
| mPE | metallocene catalyzed ethylene/ alpha olefin copolymer | Dow |
| COC1 | TOPAS™ 9506X1 | Ticona |
| COC2 | TOPAS™ 6013 | Ticona |
| COC3 | TOPAS™ 8007 | Ticona |
| EVA | ESCORENE™ LD-318.92 | ExxonMobil |
| EVA2 | EVA blend (see below) | |
| EVA tie | Ethylene/vinyl acetate copolymer | |
| OS1 | OSP500R™ or DS4713R™ | Chevron Phillips |
| OSM1 | OSP100M | Chevron Phillips |
| PP | polypropylene | |

AB is a masterbatch having about 80% linear low density polyethylene, and about 20% of an antiblocking agent (diatomaceous earth).

COC1 is an ethylene/norbornene copolymer.
COC2 is an ethylene/norbornene copolymer.
COC3 is an ethylene/norbornene copolymer.
OS1 is an oxygen scavenger resin, poly(ethylene/methyl acrylate/cyclohexene methyl acrylate) (abbreviated as EMCM).
EVA is ethylene/vinyl acetate copolymer with 9 weight % vinyl acetate comonomer.

EVA2 is blend of 70% ethylene/vinyl acetate copolymer, 10% EVA processing aid, and 20% zeolite.

OSM1 is a masterbatch produced from a carrier resin (ethylene/methyl acrylate), with 1%, by weight of the masterbatch, of cobalt present in a prill (solid) cobalt oleate, and 1%, by weight of the masterbatch, of tribenzoyl triphenyl benzene (1,3,5-tris(4-benzoylphenyl)benzene).

PE 4517 is a low density polyethylene resin.

All compositional percentages given herein are by weight, unless indicated otherwise.

Hot tack values are reported in Newtons/inch at 130° C., per ASTM F 1921-98.

| | | Layer 1 | Layer 2 | Layer 3 | Layer 4 | Layer 5 | Total Gauge | Hot Tack |
|---|---|---|---|---|---|---|---|---|
| Control #1 | | EAO 0.25 | EAO 0.75 | EVA tie 0.2 | PP homo 0.75 | | 1.95 mils | 6.2 N/in |
| Control #2 | | EAO 0.25 | 90% OS1 & 10% OSM1 0.75 | EVA tie 0.2 | PP 0.75 | | | 3.0 N/in |
| 1 | | mPE 0.25 | EMCM 0.75 | EVA tie 0.5 | EMCM 0.75 | PP 0.75 | 3.00 | 4.3 N/in |
| 2 | | mPE 0.25 | 90% EMCM & 10% OSM1 0.75 | EVA tie 0.5 | 90% EMCM & 10% OSM1 0.75 | PP 0.75 | 3.00 | 4.4 N/in |
| 3 | | 80% mPE & 15% COC1 & 5% AB/slip 0.25 | 90% EMCM & 10% OSM1 0.75 | EVA tie 0.5 | 90% EMCM & 10% OSM1 0.75 | PP 0.75 | 3.00 | 4.3 N/in |
| 4 | | 80% mPE & 15% COC1 & 5% AB/slip 0.25 | EMCM 0.75 | EVA tie 0.5 | EMCM 0.75 | PP 0.75 | 3.00 | 4.1 N/in |
| 5 | | 80% mPE & 15% COC1 & 5% AB/slip 0.25 | 80% EMCM & 10% OSM1 & 10% COC1 0.75 | EVA tie 0.5 | 80% EMCM & 10% OSM1 & 10% COC1 0.75 | PP 0.75 | 3.00 | 5.2 N/in |
| 6 | | 80% mPE & 15% COC1 & 5% AB/slip 0.25 | 90% EMCM & 10% COC1 0.75 | EVA tie 0.5 | 90% EMCM & 10% COC1 0.75 | PP 0.75 | 3.00 | 4.6 N/in |
| 7 | | 80% mPE & 15% COC1 & 5% AB/slip 0.25 | 90% EMCM & 10% COC2 0.75 | EVA tie 0.5 | 90% EMCM & 10% COC2 0.75 | PP 0.75 | 3.00 | 4.3 N/in |
| 8 | | mPE 0.25 | 90% EMCM & 10% OSM1 0.25 | 90% EMCM & 10% OSM1 0.25 | 90% EMCM & 10% OSM1 0.25 | PP 0.75 | 1.75 | 3.1 |
| 9 | | 82% mPE & 15% COC1 & 3% AB/slip 0.25 | 90% EMCM & 10% OSM1 0.25 | 90% EMCM & 10% OSM1 0.25 | 90% EMCM & 10% OSM1 0.25 | PP 0.75 | 1.75 | 4 |
| 10 | | 82% mPE & 15% COC1 & 3% AB/slip 0.25 | 80% EMCM & 10% OSM1 & 10% COC1 0.25 | 80% EMCM & 10% OSM1 & 10% COC1 0.25 | 80% EMCM & 10% OSM1 & 10% COC1 0.25 | PP 0.75 | 1.75 | 3.7 |
| 11 | | 82% mPE & 15% COC1 & | 80% EMCM & 10% OSM1 & | 80% EMCM & 10% OSM1 & | 80% EMCM & 10% OSM1 & | PP | | 4.6 |

-continued

| | Layer 1 | Layer 2 | Layer 3 | Layer 4 | Layer 5 | Total Gauge | Hot Tack |
|---|---|---|---|---|---|---|---|
| | 3% AB/slip 0.25 | 10% COC3 0.25 | 10% COC3 0.25 | 10% COC3 0.25 | 0.75 | 1.75 | |
| 12 | 82% mPE & 15% COC1 & 3% AB/slip 0.25 | 75% EMCM & 10% OSM1 & 15% COC3 0.25 | 75% EMCM & 10% OSM1 & 15% COC3 0.25 | 75% EMCM & 10% OSM1 & 15% COC3 0.25 | PP 0.75 | 1.75 | 4.9 |
| 13 | 82% mPE & 15% COC3 & 3% AB/slip 0.25 | 75% EMCM & 10% OSM1 & 15% COC3 0.25 | 75% EMCM & 10% OSM1 & 15% COC3 0.25 | 75% EMCM & 10% OSM1 & 15% COC3 0.25 | PP 0.75 | 1.75 | 6 |
| 14 | 82% mPE & 15% COC3 & 3% AB/slip 0.25 | 75% EMCM & 10% OSM1 & 15% PP 0.25 | 75% EMCM & 10% OSM1 & 15% PP 0.25 | 75% EMCM & 10% OSM1 & 15% PP 0.25 | PP 0.75 | 1.75 | 4.7 |
| 15 | 77% mPE & 15% COC3 & 8% AB 0.25 | 90% EMCM & 10% OSM1 0.25 | 90% EMCM & 10% OSM1 0.25 | 90% EMCM & 10% OSM1 0.25 | PP 0.75 | 1.75 | 3.4 |
| 16 | 77% mPE & 15% COC3 & 8% AB 0.25 | 80% EMCM & 10% OSM1 & 10% COC1 0.25 | 80% EMCM & 10% OSM1 & 10% COC1 0.25 | 80% EMCM & 10% OSM1 & 10% COC1 0.25 | PP 0.75 | 1.75 | 3.9 |
| 17 | 92% PE4517 & 8% AB 0.19 12% | COC1 0.22 12% | 90% OS1 & 10% OSM1 0.69 45% | 95% EVA & 5% EVA2 0.52 30% | PET | 1.62 | 4.3 |
| 18 | 92% PE4517 & 8% AB 0.21 13% | COC3 0.19 13% | 90% OS1 & 10% OSM1 0.65 40% | 95% EVA & 5% EVA2 0.52 33% | PET | 1.57 | 4.9 |

What is claimed is:

1. An oxygen scavenger film comprising:
   a) a first layer comprising an oxygen scavenger, and
   b) a second layer comprising a cyclic olefin copolymer; and
   c) a sealant layer disposed adjacent the second layer comprising the cyclic olefin copolymer;
   wherein the sealant layer comprises a material selected from the group consisting of ethylene/alpha olefin copolymer, ethylene/vinyl acetate copolymer, ionomer resin, ethylene/acrylic or methacrylic acid copolymer, ethylene/acrylate or methacrylate copolymer, propylene polymer or copolymer, and low density polyethylene.

2. The oxygen scavenger film of claim 1 wherein the oxygen scavenger comprises:
   a) an organic oxygen scavenger,
   b) a transition metal catalyst, and
   c) optionally a photoinitiator.

3. The oxygen scavenger film of claim 1 wherein the organic oxygen scavenger comprises one or more materials selected from the group consisting of
   i) ethylenically unsaturated hydrocarbon,
   ii) a polymer having a polymeric backbone, cyclic olefinic pendent group, and linking group linking the olefinic pendent group to the polymeric backbone,
   iii) a copolymer of ethylene and a strained, cyclic alkylene, and
   iv) ethylene/vinyl aralkyl copolymer.

4. The oxygen scavenger film of claim 1 wherein the sealant layer comprises a blend of
   a material selected from the group consisting of ethylene/alpha olefin copolymer, ethylene/vinyl acetate copolymer, ionomer resin, ethylene/acrylic or methacrylic acid copolymer, ethylene/acrylate or methacrylate copolymer, propylene polymer or copolymer, and low density polyethylene; and
   a cyclic olefin copolymer.

5. The oxygen scavenger film of claim 1 comprising an oxygen barrier layer comprising a polymer having an oxygen transmission rate of no more than 100 cc/m$^2$/24 hr at 25° C., 0% RH, 1 atm (ASTM D 3985).

6. The film of claim 5 wherein the polymer having an oxygen transmission rate of no more than 100 cc/m$^2$/24 hr at 25° C., 0% RH, 1 atm (ASTM D 3985) comprises a material selected from the group consisting of polyester, polyvinyl alcohol, ethylene vinyl alcohol copolymer, polyethylene naphthalate, polyamide, copolyamide, polyacrylonitrile, acrylonitrile copolymer, liquid crystal polymer, SiO$_x$, polyvinyl chloride, polyvinylidene chloride, vinylidene chloride copolymer, carbon, metal, and metal oxide.

7. An oxygen scavenger film comprising:
   a layer comprising a blend of:
      i) an oxygen scavenger, and
      an ethylene/norbornene copolymer; and
   a sealant layer disposed adjacent the layer comprising the blend of the oxygen scavenger and ethylene/norbornene copolymer, the sealant layer comprising a material selected from the group consisting of ethylene/alpha olefin copolymer, ethylene/vinyl acetate copolymer, ionomer resin, ethylene/acrylic or methacrylic acid copolymer, ethylene/acrylate or methacrylate copolymer, and low density polyethylene.

8. The oxygen scavenger film of claim 7 wherein the oxygen scavenger comprises:
   a) an organic oxygen scavenger,
   b) a transition metal catalyst, and
   c) a photoinitiator.

9. The oxygen scavenger film of claim 8 wherein the organic oxygen scavenger comprises one or more material selected from the group consisting of
   i) ethylenically unsaturated hydrocarbon,
   ii) a polymer having a polymeric backbone, cyclic olefinic pendent group, and linking group linking the olefinic pendent group to the polymeric backbone,
   iii) a copolymer of ethylene and a strained, cyclic alkylene, and
   iv) ethylene/vinyl aralkyl copolymer.

10. The oxygen scavenger film of claim 7 wherein the sealant layer comprises a blend of
   a) material selected from the group consisting of ethylene/alpha olefin copolymer, ethylene/vinyl acetate copolymer, ionomer resin, ethylene/acrylic or methacrylic acid copolymer, ethylene/acrylate or methacrylate copolymer, propylene polymer or copolymer, and low density polyethylene; and
   b) an ethylene/norbornene copolymer.

11. The oxygen scavenger film of claim 7 comprising an oxygen barrier layer comprising a polymer having an oxygen transmission rate of no more than 100 cc/m²/24 hr at 25° C., 0% RH, 1 atm (ASTM D 3985).

12. The oxygen scavenger film of claim 11 wherein the polymer having an oxygen transmission rate of no more than 100 cc/m²/24 hr at 25° C., 0% RH, 1 atm (ASTM D 3985) comprises a material selected from the group consisting of polyester, polyvinyl alcohol, ethylene vinyl alcohol copolymer, polyethylene naphthalate, polyamide, copolyamide, polyacrylonitrile, acrylonitrile copolymer, liquid crystal polymer, $SiO_x$, polyvinyl chloride, polyvinylidene chloride, vinylidene chloride copolymer, carbon, metal, and metal oxide.

13. The oxygen scavenger film of claim 1 wherein the average oxygen scavenging rate of the film is at least 25 cc/m2/day for at least two days after the oxygen scavenging property of the film is activated.

14. The oxygen scavenger film of claim 7 wherein the average oxygen scavenging rate of the film is at least 25 cc/m2/day for at least two days after the oxygen scavenging property of the film is activated.

15. The oxygen scavenger film of claim 1 wherein at least one layer of the film is cross-linked.

16. The oxygen scavenger film of claim 7 wherein at least one layer of the film is cross-linked.

17. The oxygen scavenger film of claim 1 wherein the film is oriented.

18. The oxygen scavenger film of claim 7 wherein the film is oriented.

19. The oxygen scavenger film of claim 1 wherein the film is heat shrinkable.

20. The oxygen scavenger film of claim 7 wherein the film is heat shrinkable.

21. A method of triggering an oxygen scavenger film comprising:
   a) providing an oxygen scavenger film comprising
      i) a first layer comprising an oxygen scavenger,
      ii) a second layer comprising a cyclic olefin copolymer; and
      iii) a sealant layer disposed adjacent the second layer comprising the cyclic olefin copolymer, the sealant layer comprising a material selected from the group consisting of ethylene/alpha olefin copolymer, ethylene/vinyl acetate copolymer, ionomer resin, ethylene/acrylic or methacrylic acid copolymer, ethylene/acrylate or methacrylate copolymer, and low density polyethylene; and
   b) subjecting the oxygen scavenger film to a dosage of actinic radiation effective to trigger the oxygen scavenger.

22. The method of claim 21 wherein the actinic radiation comprises UV light.

23. The method of claim 22, wherein the UV light has a wavelength of between 200 and 400 nm.

24. The method of claim 21 wherein the oxygen scavenger film is exposed to a source of actinic radiation at an intensity at 254 nm of between 1.0 and 30 mW/cm².

25. The method of claim 21 wherein the oxygen scavenger film is exposed to a source of actinic radiation at an intensity and residence time sufficient to provide said article with a dose of actinic radiation of between 300 mJ/cm² and 1600 mJ/cm².

26. A method of triggering an oxygen scavenger film comprising:
   a) providing an oxygen scavenger film comprising
      i) a layer comprising a blend of
         (a) an oxygen scavenger and
         (b) an ethylene/norbornene copolymer; and
      ii) a sealant layer disposed adjacent the layer comprising the blend of the oxygen scavenger and ethylene/norbornene copolymer, the sealant layer comprising a material selected from the group consisting of ethylene/alpha olefin copolymer, ethylene/vinyl acetate copolymer, ionomer resin, ethylene/acrylic or methacrylic acid copolymer, ethylene/acrylate or methacrylate copolymer, and low density polyethylene; and
   b) subjecting the oxygen scavenger film to a dosage of actinic radiation effective to trigger the oxygen scavenger.

27. The method of claim 26 wherein the actinic radiation comprises UV light.

28. The method of claim 27, wherein the UV light has a wavelength of between 200 and 400 nm.

29. The method of claim 26 wherein the oxygen scavenger film is exposed to a source of actinic radiation at an intensity at 254 nm of between 1.0 and 30 mW/cm².

30. The method of claim 26 wherein the oxygen scavenger film is exposed to a source of actinic radiation at an intensity and residence time sufficient to provide said article with a dose of actinic radiation of between 300 mJ/cm² and 1600 mJ/cm².

* * * * *

UNITED STATES PATENT AND TRADEMARK OFFICE
CERTIFICATE OF CORRECTION

| | |
|---|---|
| PATENT NO. | : 7,258,930 B2 |
| APPLICATION NO. | : 11/074188 |
| DATED | : August 21, 2007 |
| INVENTOR(S) | : Rivett et al. |

It is certified that error appears in the above-identified patent and that said Letters Patent is hereby corrected as shown below:

Column 11, Line 65 Claim 4, "a material" should be -- a) a material--
Column 12, Line 35 Claim 4, "a cyclic olefin" should be -- b) a cyclic olefin--
Column 12, Line 52 Claim 7, "a layer" should be -- a) a layer--
Column 12, Line 54 Claim 7, " an ethylene/norbornene" should be -- ii) an ethylene/nornornene--
Column 12, Line 55 Claim 7, " a sealant" should be -- b) a sealant --

Signed and Sealed this

Eighteenth Day of December, 2007

JON W. DUDAS
*Director of the United States Patent and Trademark Office*

UNITED STATES PATENT AND TRADEMARK OFFICE
CERTIFICATE OF CORRECTION

PATENT NO. : 7,258,930 B2
APPLICATION NO. : 11/074188
DATED : August 21, 2007
INVENTOR(S) : Rivett et al.

Page 1 of 1

It is certified that error appears in the above-identified patent and that said Letters Patent is hereby corrected as shown below:

Column 12, Line 54 Claim 7, "ii) an ethylene/nornornene" should be
-- ii) an ethylene/norbornene --

Signed and Sealed this

Seventeenth Day of June, 2008

JON W. DUDAS
*Director of the United States Patent and Trademark Office*